Jan. 6, 1959 S. E. SCHROEDER 2,867,131
REMOTE CONTROL MECHANISM FOR MOTOR BOATS
Filed Oct. 30, 1956 6 Sheets-Sheet 2

Fig. 2

Inventor,
Simon E. Schroeder,
By: Wilson & Geffert Attys.

Jan. 6, 1959  S. E. SCHROEDER  2,867,131
REMOTE CONTROL MECHANISM FOR MOTOR BOATS
Filed Oct. 30, 1956  6 Sheets-Sheet 3

Fig. 3

Inventor,
Simon E. Schroeder,
By: Wilson & Geppert Attys.

Jan. 6, 1959 S. E. SCHROEDER 2,867,131
REMOTE CONTROL MECHANISM FOR MOTOR BOATS
Filed Oct. 30, 1956 6 Sheets—Sheet 5

Inventor,
Simon E. Schroeder,
By: Wilson & Leppert Attys.

United States Patent Office 2,867,131
Patented Jan. 6, 1959

2,867,131

REMOTE CONTROL MECHANISM FOR MOTOR BOATS

Simon E. Schroeder, Oshkosh, Wis., assignor, by mesne assignments, to Fox River Manufacturing Company, Oshkosh, Wis., a corporation of Wisconsin Application October 30, 1956, Serial No. 619,321

17 Claims. (Cl. 74—472)

The present invention relates to novel control mechanism for motor boats and particularly those equipped with an outboard motor, whereby the operator may from a forward position or one remote from the motor readily and positively control the shifting of the gears from neutral to forward or reverse positions and synchronously and positively control the operation of the throttle and speed of operation.

Among the objects of the present invention is to provide a novel control mechanism for controlling (1) the shifting of the clutch or gears and (2) the throttle of a motor in such manner that the throttle remains at idling speed until shifting or clutching from neutral to forward or reverse position has been effected and thus avoid racing of the engine during the period of shifting with possible damage to the operating mechanism of the motor.

When the control mechanism is actuated to shift from forward or reverse operating position back to neutral, the invention provides for the initial movement of the throttle to idling position after which the clutch or gears are shifted to neutral position. Thus the clutch or gears may be quickly shifted from neutral to forward or reverse and back again, from forward to reverse or from reverse to forward without delay and without damage to the transmission.

The present invention further comprehends a novel single lever control for controlling both the transmission or forward and reverse gearing and the engine speed whereby to greatly simplify the operation of outboard motor boats.

A further object of the present invention is the provision in combination with the novel single lever control mechanism for controlling in a novel manner both the transmission and throttle of an outboard motor, of a novel auxiliary throttle control for use when starting the motor. In the present novel embodiment of control mechanism, when the combined gear shift and throttle control lever is in neutral position for starting, the novel auxiliary throttle control is shifted from a preset idling position to a partially open position. Then as the gear and throttle control lever is shifted to forward or reverse position, the auxiliary throttle control is moved to its preset idling position.

Another object of the present invention is the provision of a novel control mechanism for an outboard motor boat in which there is provided a simplified assembly of camming means and linkage for controlling both the shifting of the gears and of the throttle in such manner that the throttle remains at idling position until the gears are shifted to forward or reverse operation. In combination with such control assembly, the present invention comprehends the provision of a novel auxiliary throttle control for partially opening the throttle when starting, and which auxiliary control is automatically released and moved to its inoperative position when shifting of the gears is effected.

A further object of the present invention is the provision of a novel gear and throttle control mechanism for controlling in predetermined sequence the clutching of the gears for forward or reverse operation, and novel means for adjusting the connection between the remote gear control mechanism and the motor.

Further objects are to provide a construction of maximum simplicity, efficiency, economy and ease of assembly and operation, and such further objects, advantages and capabilities as will later more fully appear and are inherently possessed thereby.

Figure 1:
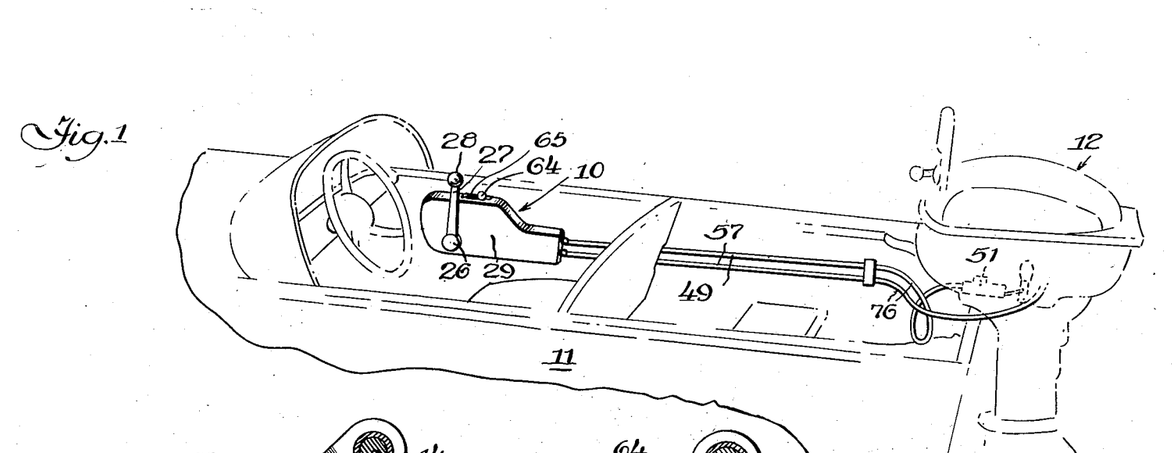
Figure 1 is a fragmentary view in perspective of an outboard motor boat equipped with the present novel control mechanism for synchronously operating the gear shift and throttle of the outboard motor.

Referring to the disclosure in the drawings and to the embodiment selected to illustrate the present invention, the present gear shift and throttle control assembly comprises a housing 10 mounted at one side of the boat 11 in a position convenient for the operator and remote from the motor 12 (Fig. 1). This housing may be mounted in any suitable manner and includes a base plate 13 suitably secured to the boat. In the housing is mounted a transverse shaft or pin 14 upon which is pivotally mounted one end of a cam plate 15. This cam plate has an internal slot of substantially keyhole shape (Figs. 2, 3 and 4) which at its upper end includes a relatively narrow and longitudinally extending slot 16 merging into a substantially larger and approximately elliptical-shaped slot or aperture 17.

Figure 5:
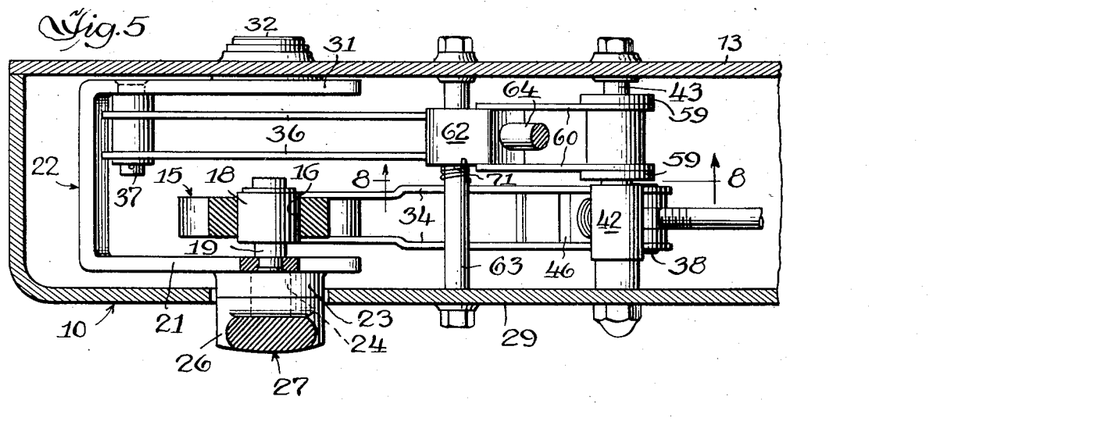
Fig. 5 is a view in horizontal cross section through the housing and control mechanism with the view taken on the irregular line 5—5 of Fig. 2 and viewed in the direction of the arrows.
Figure 6:
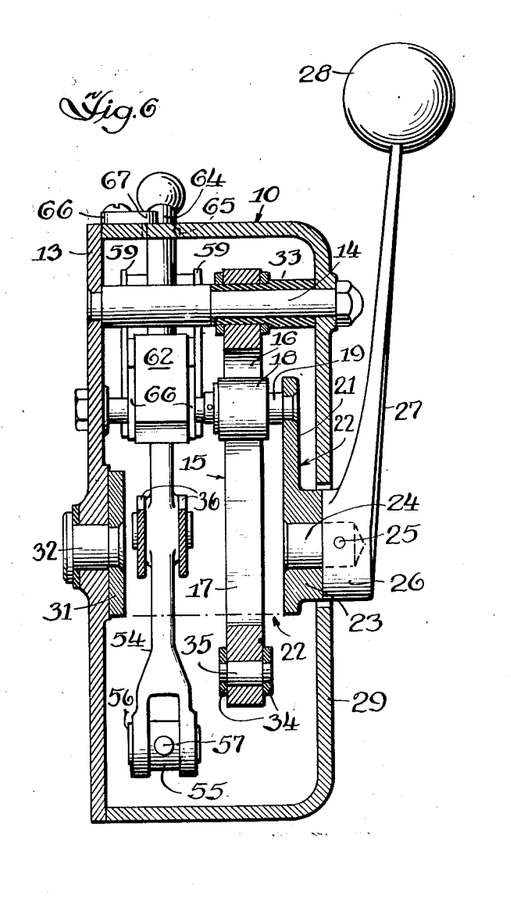
Fig. 6 is a view in vertical cross section through the housing and control mechanism, the view being taken in a plane represented by the line 6—6 of Fig. 2 and viewed in the direction of the arrows.
Figure 7:
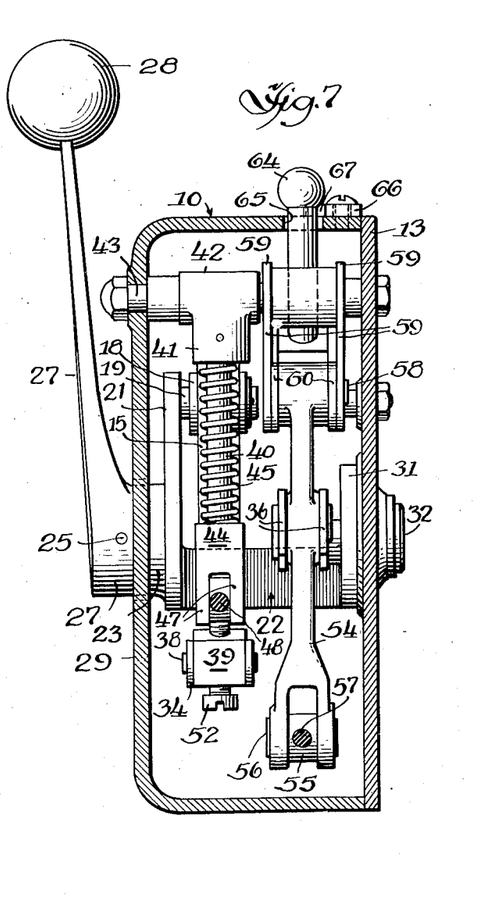
Fig. 7 is a view in vertical cross section through the housing taken in a plane represented by the line 7—7 of Fig. 2 and viewed in the direction of the arrows, the view showing in end elevation the operating parts.

Into this slot or aperture of the cam plate 15 projects a roller 18 mounted on the inner end of a pin 19 having its other end eccentrically mounted in a leg or plate 21 of a substantially U-shaped bracket 22. This leg or plate 21 has a hub 23 anchored upon one end of a pin 24 with the other end of this pin keyed or pinned at 25 (Figs. 6 and 7) to the end 26 of a control lever 27 having an operating handle or knob 28. The hub 23 of the plate 21 and the end 26 of the control lever 27 are positioned for rotation or pivotal movement in an opening in the front 29 of the housing 10. The other leg or plate 31 of the U-shaped bracket 22 is pivotally mounted upon a pin 32 in the base plate 13 of the housing 10 (Figs. 5, 6 and 7).

Rotating the control lever 27 by its handle or knob 28 forwardly (Fig. 3) or rearwardly (Fig. 4) from the neutral or inoperative position (Fig. 2) swings the leg or plate 21 of the U-shaped bracket 22 to carry the roller 18 from a position within the relatively narrow slot 16 of the cam plate 15 to a position within the connected, larger slot or opening 17 of this plate. While in the slot 16, the roller 18 in its arc of travel moves the cam plate 15 about its fixed pivot on the bearing sleeve 33 of the transverse shaft or pin 14 sufficiently to clutch either the forward or reverse gear depending on whether the cam plate 15 is swung in a clockwise direction by counter-clockwise movement of the control lever 27 (Fig. 3), or the cam plate 15 is swung in a counter-clockwise direction by clockwise movement of the control lever 27 (Fig. 4). As the roller 18 leaves the slot 16 and enters the larger slot or aperture 17, further movement of the control lever 27 and the plate or leg 21 in the direction of their initial travel no longer swings the cam plate 15 about its pivot although the plate or leg 21 of the bracket 22 continues to rotate in the direction of throw of the lever 27. This will be evident from Fig. 3 where the arc of travel of the roller 18 about the pivot pin 24 and the adjacent curved contour of the slot 17 is such that the roller rides along the curved contour of the slot without moving the cam plate 15.

As the movement of the control lever 27 from its neutral position (Fig. 2) to either its forward position (Fig. 3) or its reverse position (Fig. 4) clutches the gears of the motor for driving in a forward or reverse direction, and also controls the throttle on the motor, the present invention comprehends mechanism associated with the single control lever 27 for the operation of a clutch, shifting of gears or transmission of the remotely positioned motor, and for controlling the throttle of the motor in a predetermined sequence whereby when the controls are in neutral position the motor idles and the throttle is not opened until the clutch or gears are shifted for forward or reverse operation. Only after shifting has been accomplished, does continued movement of the single control lever in the direction of its initial movement open the throttle the desired amount for the desired speed.

Figure 2:
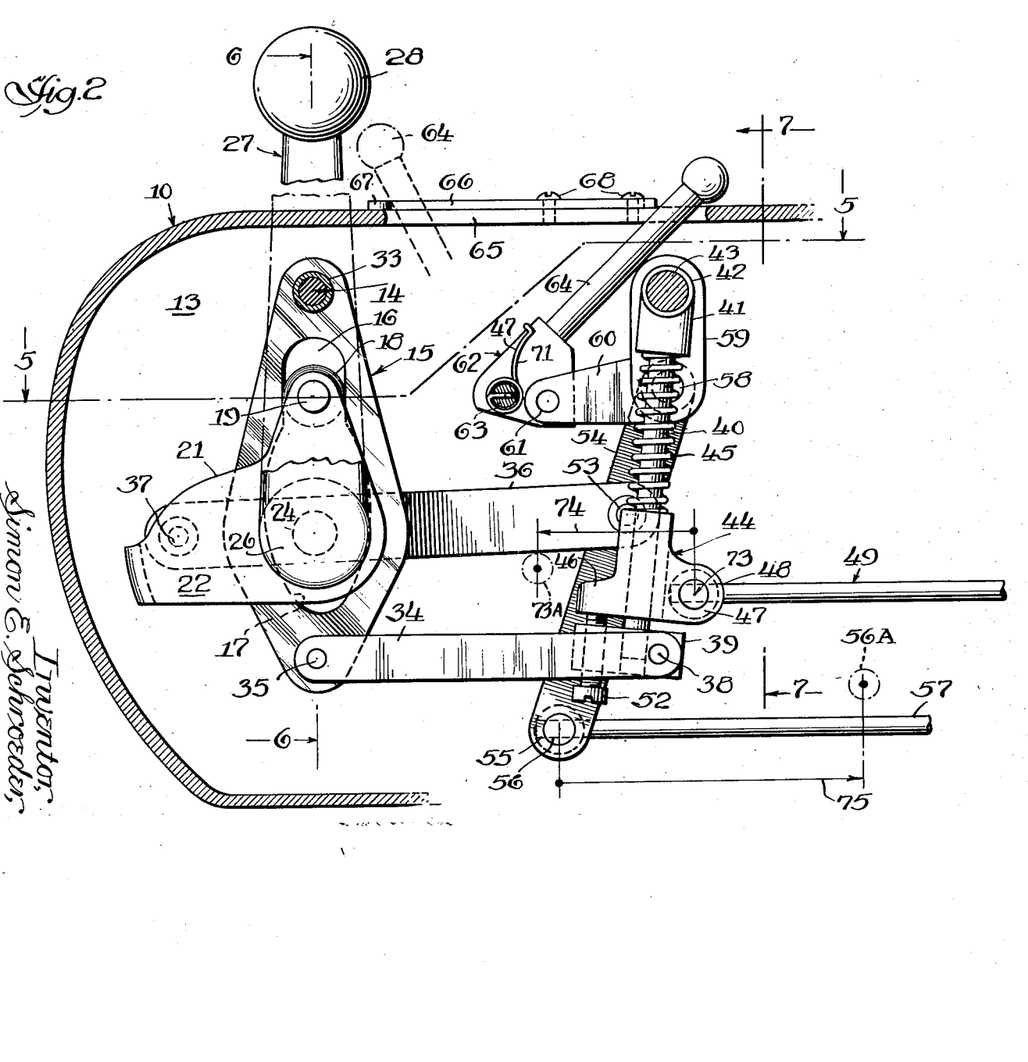
Fig. 2 is a fragmentary enlarged view in side elevation of the present novel control mechanism with its single lever control for shifting the gears of an outboard motor and for controlling the throttle through suitable camming means, linkage and connections, the housing for such mechanism being broken away and the control lever being shown in its neutral position from which it is moved to forward and reverse.
Figure 3:
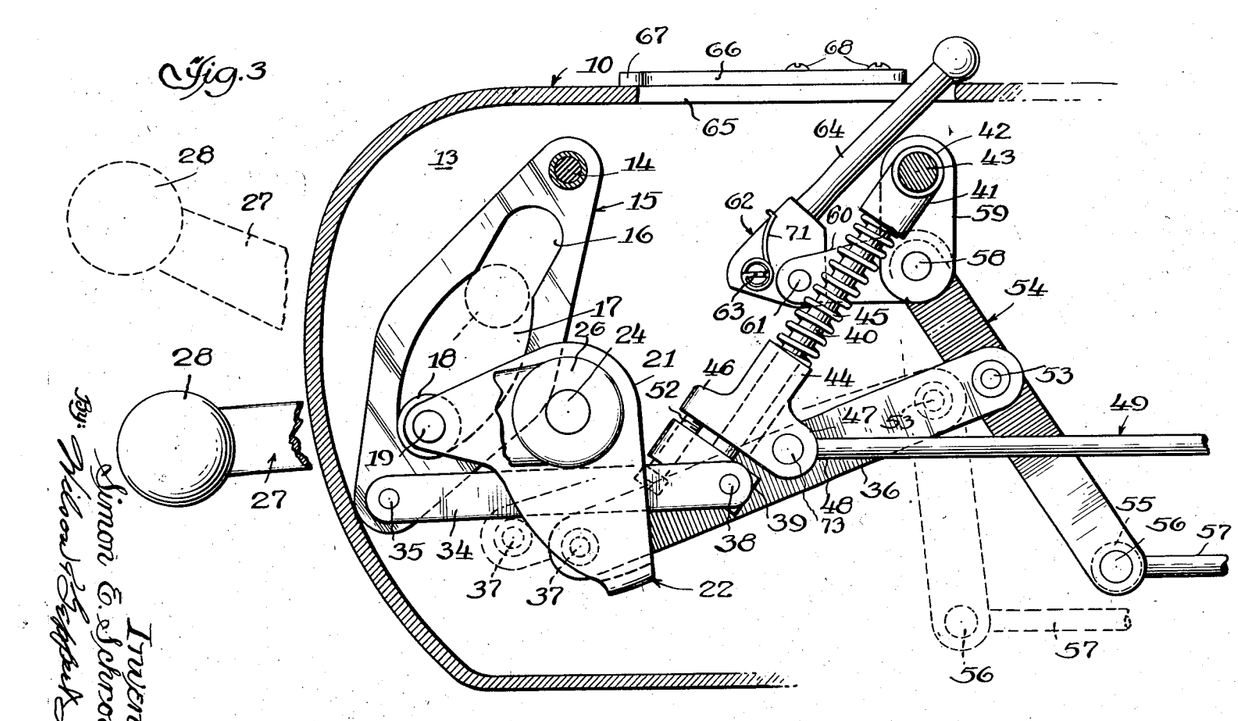
Fig. 3 is a view similar to Fig. 2 but showing the position of the control mechanism when the control lever has been moved to its forward position and also showing in dotted lines an intermediate position of the lever.
Figure 4:
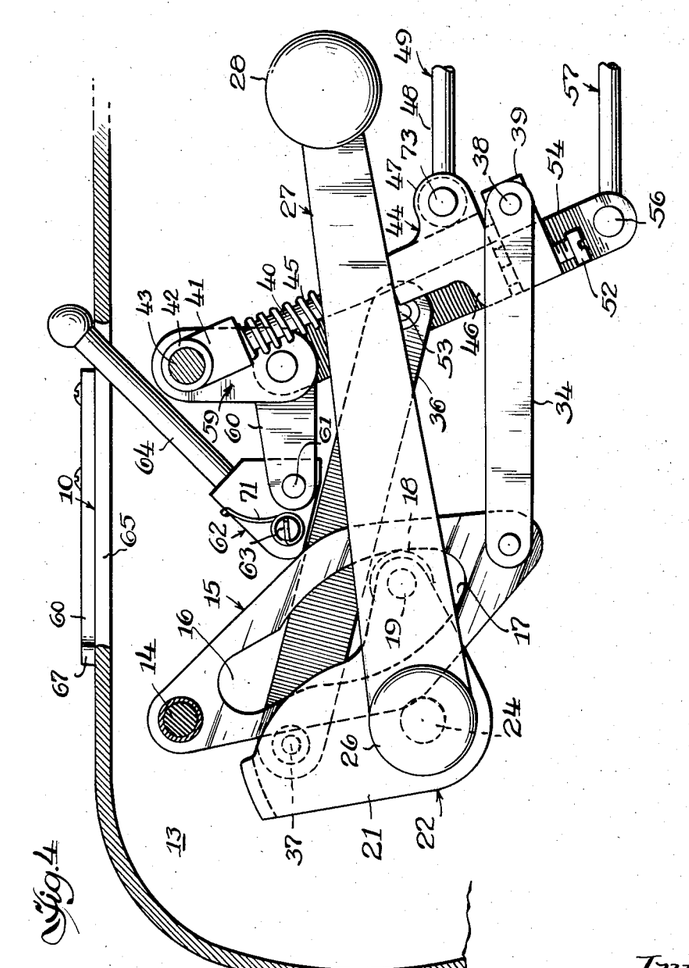
Fig. 4 is a view similar to Fig. 3 but showing the position of the control mechanism when the control lever has been moved to the right for reversing the motor.

Assuming the single control lever has been moved from its vertical neutral position shown in Fig. 2 to the forward position shown in full lines in Fig. 3, the clutch or gears have been fully engaged by the time the roller 18 has been moved from the narrow slot 16 into the connected elliptical slot 17 after which the throttle is opened. Swinging the single control lever 27 back from its forward operating position (Fig. 3) to neutral, the throttle is first closed or moved to idling speed after which the gears are disengaged or declutching is effected and if movement of the lever 27 is then continued beyond neutral to reverse position, the throttle is not opened until the gears are clutched or shifted into reverse engagement.

To accomplish the above operation, one end of a pair of links or arms 34,34 is pivotally connected by a transverse pin 35 to the opposite faces of the lower or depending end of the cam plate 15 for actuating the controls for the gear shift, and one end of a pair of links or arms 36,36 for controlling the throttle is connected to a pin 37 carried by the back leg or plate 31 of the bracket 22. These eccentrically located pins 35 and 37 carried by the cam plate 15 and leg or plate 31 on the bracket 22, respectively, oscillate the ends of the links or arms 34 and 36 and move the latter as will hereafter be described.

With respect to shifting the gears, the spaced links or arms 34 are pivotally connected by a transverse pin 38 to the opposite sides of a block 39 secured to the lower end of a rod 40, the upper end of this rod being affixed to a connector 41 pivotally connected by its hub or bracket 42 to a fixed stub shaft 43 bridging the housing 10 and base plate 13. Slidably mounted on the rod 40 is a sleeve member 44 that is spring-biased to its lowered position on the rod by a coil or compression spring 45, the upper end of the spring seating against the connector 41 and the lower end against the sleeve member 44.

The spring-loaded sleeve member 44 is provided with a stop or abutment 46 and a bifurcated offset 47 into which projects and is connected the adjoining end 48 of a control or push-pull rod 49 connected at its other end to the clutch or gear shift of the motor 12 at 51. This provides a resilient connection between the control mechanism and the motor. To adjust the position of the sleeve member 44, the block 39 is provided with an adjusting or set screw 52 abutting the stop 46, whereby this adjusting screw may vary the arc of movement and travel or throw of the control or push-pull rod 49 and its connection to the motor as the joined parts are moved when shifting the lever 27.

For controlling movement of the throttle, the spaced links or arms 36 are pivotally connected at their outer end by a transverse pin 53 to an intermediate position on a link or arm 54, the lower end of this link or arm being bifurcated to receive a collar 55 and pin 56 to which is connected the adjacent end of a control or push-pull rod 57. The upper end of the link or arm 54 is pivotally connected by a pin 58 to spaced toggle links 59, 59 with the other end of these toggle links pivotally mounted on the fixed stub shaft 43. Also mounted on the transverse pin 58 is one end of a pair of spaced links 60 with the other end of these links 60 pivotally connected by a pin 61 to a block or bracket 62, the latter being pivotally mounted on a stub shaft 63 having its ends anchored in the front wall 29 and the base plate 13 of the housing 10.

Connected to the block or bracket 62 is a handle 64 of an auxiliary throttle control for opening the throttle a predetermined or desired amount when starting the motor. This handle is shown movable in a slot 65 in the top of the housing 10. To limit the throw of this handle, I have shown a slotted stop plate 66 having an abutment 67 at one end against which the handle 64 abuts at the limit of its throw. This stop or abutment 67 limits the degree to which the throttle may be opened when starting the motor, and is secured in position by spaced screws or bolts 68 projecting through its longitudinal slot 69 whereby this plate may be adjusted longitudinally. A spring 71 is provided for spring-loading and biasing the handle 64 to its inoperative position as shown in full lines in Figs. 2, 3, and 4.

Figures 8, 9, 10:
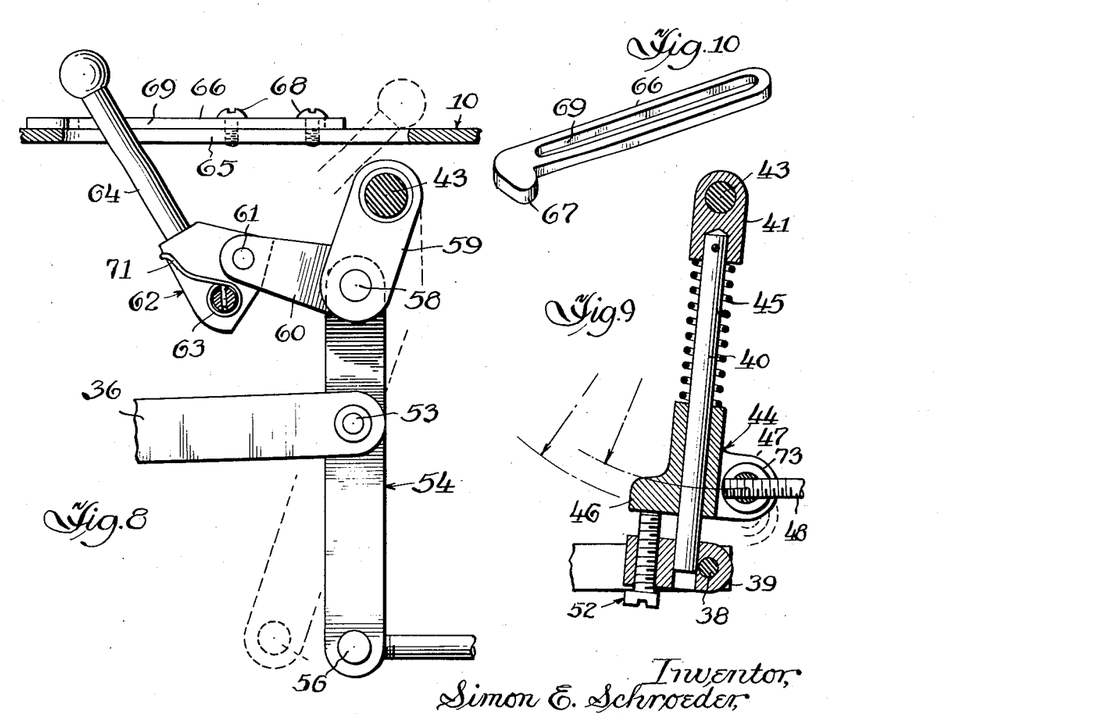
Fig. 8 is a fragmentary view in side elevation of the auxiliary throttle control which is employed merely during starting of the motor at which time it is moved from its normal idling position to the full line position shown in which it opens the throttle a predetermined amount, and is automatically moved to its inoperative, dotted line position when the control lever is moved to forward or reverse position, the view being taken in a plane represented by the line 8—8 of Fig. 5.
Fig. 9 is a view in vertical cross section through the adjusting screw for varying the leverage or arc of movement of the control mechanism for shifting the clutch or gears.
Fig. 10 is a perspective view of a slotted member for limiting the path and extent of travel of the auxiliary throttle control.

In starting the motor, the handle 64 for the auxiliary throttle control is moved from its inoperative position shown in full lines in Figs. 2, 3 and 4 to the full line position in Fig. 8 and the dotted line position in Fig. 2. In this last mentioned position the toggle links 60 and 59 are pulled by the handle 64 to the left from their normal, inoperative and substantially vertical position (Fig. 2), whereby the pivot pin 58 is moved to the left of the stationary pivot pin or stub shaft 43 and thereby pulling the upper end of the arm 54 also to the left about its pivot 53. This causes the lower end of the arm 54 to move from its dotted line position of Fig. 8 and full line position of Fig. 2, to the right to its full line position of Fig. 8 causing the throttle through its rod 57 to be opened a desired amount for starting.

After starting has been accomplished, the single control lever 27 is now moved from its neutral or vertical position (Fig. 2) to the left to forward position as shown in Fig. 3 or to the right to reverse position as shown in Fig. 4. As pointed out above, in the movement of the single control lever 27 to either forward or reverse position, the forward or reverse gear must first be clutched or engaged before the throttle can be opened for propelling the boat at the desired speed of operation.

As the single control lever 27 is moved either to forward position (Fig. 3), or to reverse position (Fig. 4), the U-shaped bracket 22 including its front plate 21 connected to this lever and the rear plate 31 of the bracket, are rotated by the lever 27 whereby the eccentric pivotal connection or pin 37 carried by the plate 31 and pivotally connected to the links or arms 36 which in turn are connected to the arm 54, causes the latter to move the links or arms 36 and their connection at 53 to the arm 54, to the right as shown in Figs. 3, 4 and 8. As the throttle control rod 57 is held relatively taut, the arm 54 is caused to pivot about the pin or connection 56 at the lower end of this rod 57 and the arm 54 to rotate through a limited arc of travel in a clockwise direction. Such movement of the arm 54 causes its upper end and pivot pin 58 to move to the right to the position shown in dotted outline in Fig. 8 and in full lines in Fig. 2. In this latter position the links 59 of the toggle are disposed in a substantially vertical position with the pivot or connection 58 in substantial vertical alignment with the stationary pin or stub shaft 43. Such movement causes the links 60 to be moved to the right and through their connection with the bracket 62 and the handle 64 of the auxiliary throttle control, this handle is automatically tripped or returned to its inoperative position shown in dotted lines in Fig. 8 and in full lines in Figs. 2, 3, and 4, with the throttle moved to and maintained in idling position while the gears are being clutched or engaged.

Continued movement of the single control lever 27 beyond the point of engagement or clutching of the gears in either forward or reverse moves the links or arms 36 to the right in Figs. 2, 3, 4 and 8 and pivots the arm 54 in a counter-clockwise direction whereby the lower end of the arm 54 and its pivot connection or pin 56 moves the throttle control rod 57 toward its open position shown in full lines in Figs. 3 and 4 and at 56A in Fig. 2.

In such subsequent movement of the arm 54 to adjust the throttle to increase or decrease the speed of travel in either forward or reverse position, the toggle links 60 and 59 remain in the full line position shown in Figs. 2, 3 and 4, and when the single control lever 27 is moved from forward or reverse to neutral position, the handle 64 of the auxiliary throttle control remains in its inoperative position (full lines Figs. 2, 3 and 4) with the throttle set for idling.

In Fig. 2 the movement or travel of the pin 73, which connects the end 48 of the gear control or push-pull rod 49 to the sleeve member 44, from its neutral to its forward position is shown in dotted lines at 73A and its path of travel designated by the line 74. This forward position is also shown in full lines in Fig. 3. While its path of travel to reverse position is not shown in Fig. 2, its reverse position is shown in Fig. 4.

The travel of the pin 56 connecting the lower end of the arm 54 to the throttle control rod 57 when moving from neutral (Fig. 2) to forward position (Fig. 3) is from the position shown in full lines in Fig. 2 to the dotted line position 56A also shown in this figure. The line 75 shows the distance the pin 56 travels from neutral and idling position to fully open when the throttle control rod 57 is moved to forward position. In reverse, it is generally not necessary that the throttle be opened to the same degree or extent as in forward position, and thus the control rod 57 need not be moved the same distance by the single control lever 27.

The connection between the forward end 48 of the gear control rod 49 and the bifurcated offset 47 of the sleeve member 44 is adjustable by the set screw 52 whereby to adjust the connection between the sleeve member and the motor 12 through the control rod 49 and the push-pull cable 76 by which this rod is connected to the transmission clutch or reversing gearing of the motor 12. Both the transmission control rod 49 and the throttle control rod 57 may be connected to the mechanism of the motor by flexible push-pull cables 76 in the manner shown in my Patent No. 2,703,989, of March 15, 1955.

Figure 11:
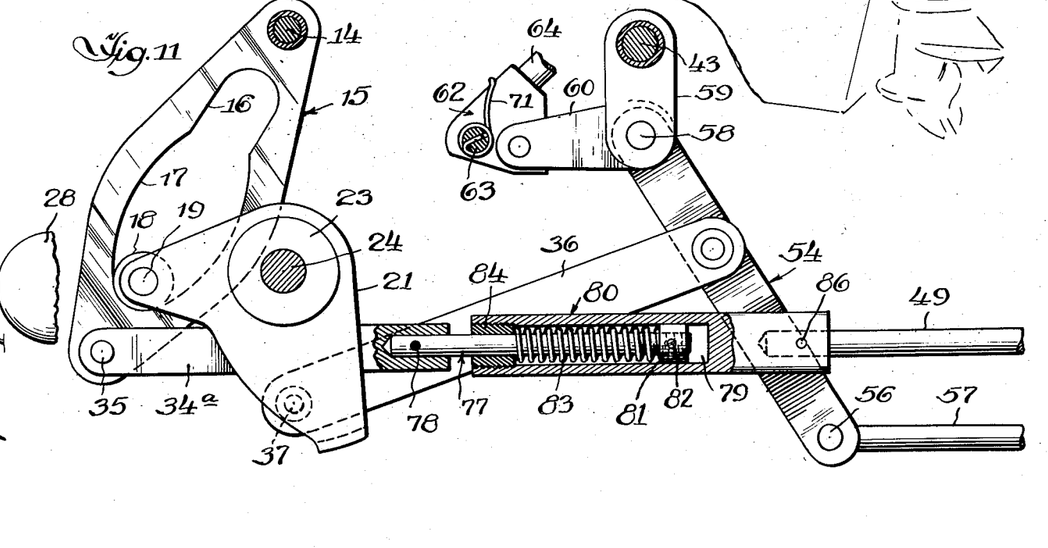
Fig. 11 is a fragmentary view, part in side elevation and part in vertical cross section, of another form of adjustable connection in the control mechanism for actuating the gear shift or clutch.

In Fig. 11 is disclosed another form of adjustable and flexible connection between the cam plate 15 and the control or push-pull rod 49 for actuating the transmission, gear shift or clutch of the motor 12. In this embodiment, the same lost-motion connection of Figs. 1 to 10, inclusive, is employed and similar reference characters have been applied, but the link 34$^a$ connected to the lower or free end of the cam plate 15 is connected to the transmission control rod 49 by means of a rod or plunger 77 having its one end pinned at 78 to the link 34$^a$ and with its other end projecting into the bore 79 of a telescoping or encompassing sleeve 80. The latter end of this rod or plunger 77 is provided with an internally threaded collar 81 adjustable on the inner end of the rod or plunger 77 and is anchored in adjusted position to this end by a set screw 82.

A coil or compression spring 83 encompassing the rod or plunger 77 has one end abutting the collar 81 and its other end abutting the inner end of a threaded collar 84 forming a closure for the bore 79, and in this latter collar the rod or plunger 77 is movable or reciprocable.

The outer end of the sleeve 80 is recessed to receive the adjoining end of the control rod 49 and the latter is pinned or connected thereto at 86. By adjusting the collar 81 on its rod or plunger 77 the compression on the spring 83 may be varied to give greater or less freedom of movement and flexibility between the link 34$^a$ and the transmission control rod 49.

From the above description and the disclosure in the drawings, it will be apparent that the present invention comprehends a novel remote control mechanism for motor boats in which a single control lever operates in a novel and predetermined sequence the transmission and throttle of the motor. By reason of the novel auxiliary throttle control for use in starting the motor and the manner in which this auxiliary control is automatically disengaged through the throttle control linkage upon operation of the control lever, most effective and fool-proof operation of the motor is assured. Furthermore, by reason of the novel manner of adjustably and flexibly connecting the control means to the control rod (Figs. 9 and 11) for controlling the transmission, compensation for possible misalignment and freedom of movement of the connected parts in their path of travel or arc of movement is established and maintained.

Having thus disclosed the invention, I claim:

1. In combination with the motor of a motor boat having a transmission adapted to be shifted from neutral into forward and reverse and a throttle controlling the fuel supply and speed of the motor, an auxiliary throttle control for use when starting the motor, control mechanism mounted in the boat remote from said motor and connected to the motor for controlling the transmission and the throttle, said remote control mechanism including a support, a single control lever pivotally mounted on said support, a U-shaped bracket having spaced parallel legs journalled in the support for swinging movement and movable by said control lever, a cam member swingably mounted at its upper end on said support and depending into the space between said legs of the bracket, eccentric means on one of said legs for actuating said cam member, means for connecting said cam member to the transmission, said lever being movable from neutral to shift the transmission to forward or reverse, a connection from the other of said legs to said throttle, and means actuated by movement of said lever from neutral to forward or reverse to shift said transmission, return said auxiliary throttle control to inoperative position and then open the throttle whereby the motor speed is increased only after the transmission is engaged for either forward or reverse and when the transmission is disengaged by movement of the lever from forward or reverse to neutral, the motor speed is reduced to idling after which the transmission is disengaged.

2. Remote control mechanism for the motor of a motor boat having a transmission adapted to be shifted from neutral into forward and reverse and a throttle controlling the fuel supply, control mechanism mounted in the boat and connected to the motor and including a single control lever for controlling in sequence the transmission and the throttle, an auxiliary control mechanism for partially opening the throttle during starting, and means actuated by movement of said lever from neutral to shift said transmission into forward or reverse, return said auxiliary control mechanism to inoperative position and open the throttle to increase the speed of the motor.

3. In combination with the motor of a motor boat having a reversible transmission adapted to be shifted from neutral into forward and reverse and a throttle controlling the fuel supply and speed of the motor, control mechanism mounted in the boat and connected to the motor for controlling the transmission and the throttle from a position remote from the motor, said remote control mechanism including a housing, a single control lever pivotally mounted in said housing and connected to the transmission, said lever being movable from neutral to shift the transmission to forward or reverse, means for connecting said control lever to said throttle, means actuated by movement of said lever from neutral to forward or reverse to first shift said transmission into forward or reverse and then open the throttle whereby the motor speed is increased only after the transmission is shifted into forward or reverse and when the transmission is disengaged by movement of the lever from forward or reverse to neutral, the throttle is first moved to idling position to reduce the speed of the motor before the transmission is disengaged, an auxiliary control for partially opening the throttle when starting the motor, and means for returning the auxiliary control to inoperative position upon movement of the control lever from neutral into forward or reverse position.

4. In combination with the motor of a motor boat having a transmission adapted to be shifted from neutral into forward and reverse and a throttle controlling the fuel supply and speed of the motor, control mechanism mounted in the boat and connected to the motor for controlling both the transmission and the throttle remote from the motor and including a support, a single control lever pivotally mounted on said support, means connecting said control lever to the transmission of the motor, means also connecting the control lever to the throttle, means actuated by movement of said lever from neutral to first shift said transmission into forward or reverse and after such shifting has been accomplished opening the throttle to increase the speed of the motor, and when the lever is shifted back to neutral the throttle is first moved to idling position after which the transmission is disengaged, an auxiliary control for partially opening the throttle when the motor is started, and means for automatically returning the auxiliary control to inoperative position by movement of the control lever from neutral position.

5. Remote control mechanism for the motor and propeller of a motor boat with the motor provided with a gear shift and a throttle for controlling the fuel supply to the motor and the speed of the boat, comprising a support mounted in an accessible location in the boat, a single control lever pivotally mounted on the support for remotely controlling the gear shift and for synchronously controlling the throttle, a U-shaped bracket having one of its legs connected to the control lever and its spaced legs rotatably mounted in said support, a cam member swingably mounted in said support between the legs of said bracket with its swinging movement actuated and controlled by one of said legs, a control rod connected to the gear shift on the motor and a control rod connected to the throttle on the motor, means for eccentrically connecting the gear shift control rod to the cam member and means for eccentrically connecting the throttle control rod to the other leg of said bracket whereby rotating said control lever from neutral to forward or reverse first rotates said cam member to actuate said gear shift control rod to shift the gears on the motor to forward or reverse and then to actuate the throttle control rod to open the throttle by rotating said eccentric member.

6. Remote control mechanism for the motor and propeller of a motor boat with the motor provided with a gear shift and a throttle for controlling the fuel supply to the motor, comprising a housing mounted in an accessible location in the boat, an auxiliary throttle control moved to operative position to partially open position for starting the motor, a single control lever pivotally mounted in the housing for remotely controlling in sequence the gear shift and the throttle as the control lever is moved from neutral to forward or reverse, an eccentric member connected to the control lever and pivotally mounted in said support, a cam member pivotally mounted in said support, means for ecentrically connecting the gear shift connection to the cam member, means for connecting the throttle connection to said eccentric member and to said auxiliary throttle control, whereby rotating said control lever from neutral to forward or reverse after said motor has been started, rotates said cam member to actuate said gear shift connection, returns said auxiliary throttle control to inoperative position and actuates the throttle control connection to open the throttle by rotating said eccentric member, and when the control lever is returned from forward or reverse to neutral said control lever first actuates the throttle control connection to move the throttle to idling and then actuates the gear shift connection to shift the gears to neutral.

7. Remote control mechanism as set forth in claim 5, including an auxiliary throttle control for partially opening the throttle when starting the motor, and means for connecting said auxiliary throttle control to said control lever for returning said auxiliary throttle control to inoperative position upon moving said control lever from neutral to forward or reverse.

8. Remote control mechanism as set forth in claim 5, including an auxiliary throttle control for partially opening the throttle when moved to starting position with the control lever in neutral position, and means connecting said auxiliary throttle control to said control lever for automatically moving said auxiliary throttle control to close the throttle when the control lever is moved to forward or reverse.

9. The combination set forth in claim 1, including an auxiliary throttle control for partially opening the throttle when starting the motor and the control lever in neutral position, and means connecting said auxiliary throttle control to said control lever for automatically moving said auxiliary throttle control to return the throttle to closed position when the control lever is moved to forward or reverse.

10. Remote control mechanism for the motor and propeller of a motor boat with the motor provided with a gear shift and a throttle for controlling the fuel supply to the motor and the speed of the boat, comprising a support mounted in an accessible location in the boat, a single control lever for remotely controlling the gear shift from neutral to forward or reverse and for synchronously controlling the throttle, said lever being pivotally mounted upon the support, a bracket pivotally mounted in the support and rotated by movement of said lever from neutral to forward or reverse, a cam plate pivotally mounted in said support and provided with a substantially keyhole slot having a relatively narrow slot at one end and a connected larger opening, an eccentric projection on said bracket adapted to be comformably received in the narrow slot of said plate when the lever is in neutral position and movable by the lever out of said narrow slot into the larger opening when the lever is rotated about its pivot from neutral toward forward or reverse and in such rotation said projection swings the cam plate, a control rod connected to the gear shift and a control rod connected to the throttle, means for connecting the gear shift control rod to the cam plate and means for connecting the throttle control rod to the bracket whereby rotation of the lever from neutral to forward or reverse first causes said projection to move out of the narrow slot and in such movement rotate the cam plate to shift the gears after which further rotation of the lever in the same direction of movement continues to rotate the bracket which in turn moves the throttle control rod to open the throttle.

11. Remote control mechanism for the motor and propeller of a motor boat with said motor having gearing for operating the propeller in forward or reverse and a throttle for controlling the fuel supplied to the motor, comprising a supporting housing, a single control lever pivotally mounted in said housing and movable from neutral position to forward or reverse operating position, a U-shaped bracket pivotally mounted in said housing with one leg of said bracket connected to said lever and its other leg pivotally mounted in the housing, a cam plate pivotally mounted at its upper end in said housing and depending into the housing between the legs of said bracket, said cam plate having a relatively narrow slot and a connected opening of greater dimensions than the slot, a roller eccentrically mounted on one leg of said bracket and projecting into said slot when the lever is in neutral position and movable out of this slot into the connected opening when the lever is shifted from neutral to forward or reverse position, a link connected at one end to the depending end of the cam plate, a gear control rod connected to the other end of said link, a link eccentrically connected at one end to one leg of said bracket, and a throttle control rod connected to the other end of said last mentioned link, said roller being moved out of said relatively narrow slot by movement of said control lever from its neutral position to either forward or reverse in which said control lever rotates the cam plate to shift the gearing for forward or reverse operation of the motor, after which the roller enters the larger connected opening in which opening the roller continues to be moved by said control lever but without further rotation of the cam plate, said control lever thereafter rotating said bracket to shift the throttle control to open the throttle.

12. In combination with the motor of a motor boat having a transmission adapted to be shifted from neutral into forward and reverse and a throttle controlling the fuel supply and speed of the motor, control mechanism mounted in the boat remote from but connected to the motor for controlling the transmission and the throttle, said remote control mechanism including a support, a single control lever pivotally mounted on said support and shiftable from neutral to shift the transmission to forward or reverse and also control the opening of the throttle, means connected to said control lever and to said transmission and shifted by the initial movement of said lever from neutral toward forward or reverse, means connected to and opening said throttle by the continued movement of said lever in the direction of its initial movement, and means for adjusting said means connecting the control lever to said transmission.

13. Remote control mechanism for the motor of a motor boat with the motor provided with a gear shift and a throttle for controlling the fuel supply to the motor and the speed of the boat, comprising a support mounted in an accessible location in the boat, a single control lever for remotely controlling the gear shift and for synchronously controlling the throttle, said lever being pivotally mounted upon the support, an eccentric member connected to the control lever and rotatably mounted in said support, a cam member pivotally mounted in said support, a control rod connected to the gear shift of the motor and a control rod connected to the throttle of the motor, means for eccentrically connecting the gear shift control rod to the cam member and including a link connected at one end to the cam member, a rod pivotally mounted at one end upon the support and at its other end connected to said link, a spring-loaded member slidably mounted on said rod and to which one end of the gear shift control rod is connected, means for adjusting said spring-loaded member on said rod, and means for connecting the throttle control rod to said eccentric member whereby rotating said control lever from neutral to forward or reverse first rotates said cam member to actuate said gear shift control rod to shift the gears of the motor to forward or reverse and then to actuate the throttle control rod to open the throttle by rotating said eccentric member.

14. Remote control mechanism for the motor of a motor boat with the motor provided with a gear shift and a throttle for controlling the fuel supply to the motor and the speed of the boat, comprising a housing mounted in an accessible location in the boat, a single control lever pivotally mounted in the housing for remotely controlling in sequence the gear shift and the throttle as the control lever is moved from neutral to forward or reverse, an eccentric member connected to the control lever and pivotally mounted in said support, a cam member pivotally mounted in said support, a connection to the gear shift on the motor and a connection to the throttle on the motor, means for eccentrically connecting the gear shift connection to the cam member, means for connecting the throttle connection to said eccentric member, said means connecting the gear shift connection to the cam member including a rod pivotally mounted at its upper end in the housing and at its lower end swingably connected to said cam member, a spring-loaded sleeve slidably mounted on said rod and connected to the gear shift, and means for adjusting the position of said sleeve member upon said rod.

15. The combination set forth in claim 12, including an auxiliary throttle control for partially opening the throttle when starting the motor, and means for connecting said auxiliary throttle control to said control lever for returning said auxiliary throttle control to inoperative position upon moving said control lever from neutral to forward or reverse.

16. Remote control mechanism as set forth in claim 13, including an auxiliary throttle control for partially opening the throttle when moved to starting position with the control lever in neutral position, and a toggle and linkage connecting said auxiliary throttle control to said control lever for automatically moving said auxiliary throttle control to close the throttle when the control lever is moved to forward or reverse.

17. Remote control mechanism as set forth in claim 14, including an auxiliary throttle control for partially opening the throttle when starting the motor and the control lever in neutral position, and linkage connecting said auxiliary throttle control to said control lever for automatically moving said auxiliary throttle control to return the throttle to closed position when the control lever is moved to forward or reverse.

References Cited in the file of this patent

UNITED STATES PATENTS

| | | |
|---|---|---|
| 2,411,732 | Kelley | Nov. 26, 1946 |
| 2,588,649 | Morse | Mar. 11, 1952 |
| 2,588,650 | Morse | Mar. 11, 1952 |
| 2,759,578 | Manzolillo | Aug. 21, 1956 |